United States Patent [19]

Mitoya

[11] Patent Number: 5,178,189
[45] Date of Patent: Jan. 12, 1993

[54] ROTARY VALVE AND A METHOD OF ASSEMBLING THE ROTARY VALVE

[75] Inventor: Yasunobu Mitoya, Nagoya, Japan

[73] Assignee: TRW Steering & Industrial Products (Japan) Co., Ltd., Tokyo, Japan

[21] Appl. No.: 896,398

[22] Filed: Jun. 10, 1992

[30] Foreign Application Priority Data

Jul. 30, 1991 [JP] Japan .................................. 3-190158

[51] Int. Cl.$^5$ ............................................ F15B 13/04
[52] U.S. Cl. .............................. 137/625.21; 91/375 A
[58] Field of Search ...................... 137/625.21, 625.22, 137/625.23, 625.24; 29/890.124, 890.12; 91/375 A

[56] References Cited

U.S. PATENT DOCUMENTS

| | | | |
|---|---|---|---|
| 4,177,714 | 12/1979 | Schluckebier | 91/375 A |
| 4,353,288 | 10/1982 | Holub | 91/375 A X |
| 4,621,703 | 11/1986 | Brietweg | 91/375 A X |
| 4,699,174 | 10/1987 | Bishop | 91/375 A X |
| 5,115,879 | 5/1992 | Imura | 91/375 A X |

*Primary Examiner*—Alan Cohan
*Attorney, Agent, or Firm*—Tarolli, Sundheim & Covell

[57] ABSTRACT

During the assembly steps of a rotary valve, after an input shaft is attached onto a torsion bar, the input shaft is rotated clockwise and counterclockwise concentrically with the torsion bar. A central position is thus detected and determined such that a hydraulic pressure, which is generated when the input shaft is rotated by some angle clockwise from the central position relative to an output shaft, is symmetrical with a hydraulic pressure generated when the input shaft is rotated by the same angle counterclockwise from the central position. While the determined central position of the input shaft in a peripheral direction relative to the torsion bar is maintained, the input shaft is axially secured. By pulling the torsion bar further into the input shaft, an engaging portion of the torsion bar engages in a securing bore of the input shaft. When a notch of the torsion bar is aligned flush with an end face of the input shaft and the torsion bar is completely press-fitted into the input shaft, a chuck portion is removed from the end of the torsion bar. Since the input shaft and the torsion bar require no through bores or O rings for interconnection, the rotary valve can be easily assembled through simple steps. At the same time, since the input shaft and the torsion bar do not have any positional deviation, the symmetry of the hydraulic pressure characteristics is improved.

20 Claims, 2 Drawing Sheets

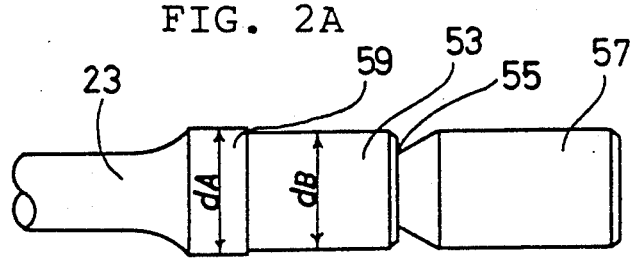
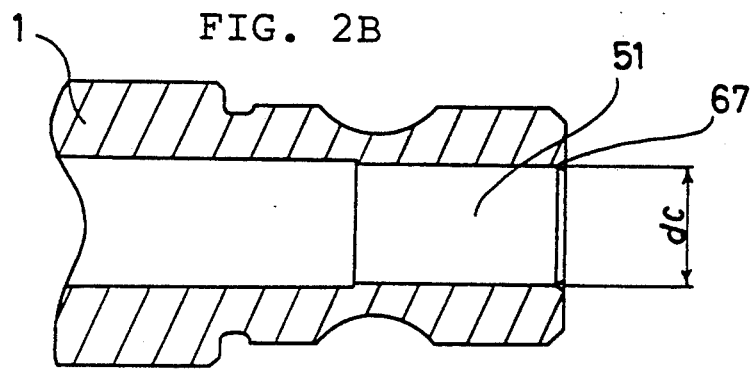
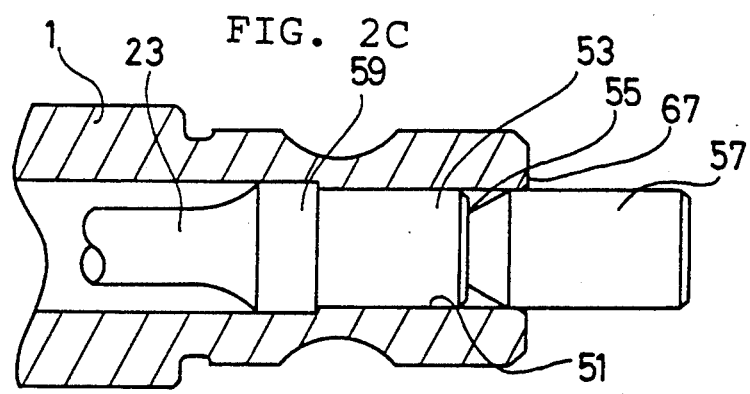
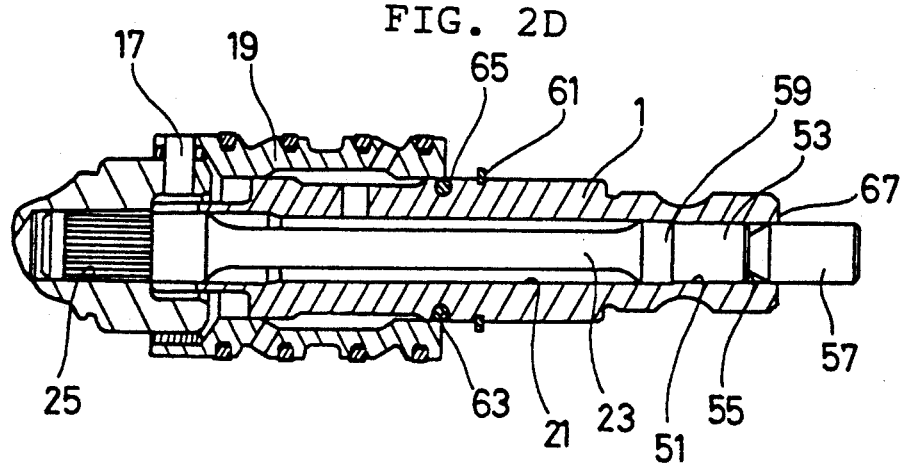

ROTARY VALVE AND A METHOD OF ASSEMBLING THE ROTARY VALVE

BACKGROUND OF THE INVENTION

This invention relates to a rotary valve for controlling the supply and discharge of fluid by relatively rotating an input shaft and an output shaft, and a method of assembling the same.

A conventional rotary valve comprises an input shaft rotated by an external operation, an output shaft arranged concentrically with the input shaft, and a torsion bar extending through the input shaft and having first and second ends connected to the input shaft and the output shaft, respectively. When the input shaft and the output shaft rotate relatively, the rotary valve controls the supply and discharge of pressurized fluid. To interconnect the input shaft and the torsion bar of the rotary valve, a central position of the input shaft is detected by turning the input shaft clockwise and counterclockwise relative to the output shaft. The central position is determined such that the characteristics of hydraulic pressure are symmetrical on both sides of the central position. While the relative positions of the input shaft and the torsion bar are kept at the central position, through bores are drilled diametrically in a connecting end of the input shaft and the associated connecting end of the torsion bar. A balance pin is then inserted into the through bores, thus fastening the input shaft and the torsion bar together. To seal the inside of the input shaft airtight, an O ring is attached on the side of the output shaft, distal from the balance pin, which is in the connecting end of the torsion bar.

In the conventional rotary valve, however, the inner diameter of the input shaft is larger in measurement than the outer diameter of the torsion bar, thus a gap exists between the input shaft and the torsion bar at the connecting end. Consequently, the input shaft and the torsion bar are prone to slippage, and the through bores are difficult to drill while the relative position between the input shaft and the torsion bar is maintained at the central position. Furthermore, since the torsion bar is harder than the input shaft, the point of a drill extended through the input shaft is prone to slip on the torsion bar, making the relative position between the input shaft and the torsion bar prone to deviate. Thus the through bores are thus difficult to drill exactly. Additionally, the through bores need to be drilled very carefully so that particles resulting from the drilling operation do not enter the rotary valve. After the through bores are drilled, the rotary valve may require a washing step to remove the particles therefrom, thus making the assembly of the rotary valve intricate. The rotary valve further requires a groove for receiving the O ring, thus further making the assembly intricate. The conventional rotary valve is thus difficult and intricate to assemble.

SUMMARY OF THE INVENTION

An object of the invention is to provide a rotary valve which can be easily assembled by a simple process.

To obtain this and other objects, the invention provides a rotary valve comprising an input shaft, an output shaft arranged concentrically with the input shaft, and a torsion bar extending concentrically through the input shaft and having first and second ends connected to the input shaft and the output shaft, respectively. When operated by the relative rotation of the input shaft and the output shaft, the rotary valve controls the supply and discharge of pressurized fluid.

A securing bore is made axially in the input shaft, and an engaging portion is made at a first end of the torsion bar for being press-fitted into the securing bore. The end of the torsion bar is connected, via a foldable and removable notch, to a chuck portion diametrically smaller than the securing bore of the input shaft. After the engaging portion is press-fitted into the securing bore to interconnect the input shaft and the torsion bar, the chuck portion is removed from the end of the torsion bar by breaking or folding at the notch.

During assembly, the torsion bar is grasped by the chuck portion and rotated with an appropriate chuck. Then, the input shaft is accordingly rotated clockwise and counterclockwise to determine the relative position of the input shaft and the output shaft such that the pressurized fluid is supplied and discharged in a desired manner. Subsequently, the input shaft is axially secured, and the torsion bar is pulled until the engaging portion of the torsion bar engages in the securing bore of the input shaft. After the input shaft and the torsion bar are securely interconnected, the chuck portion of the torsion bar is removed from the first end by folding at the notch. When the input shaft is rotated by external operation, the torsion bar is resiliently deformed, transmitting rotary torque to the output shaft, and the relative rotation of the input shaft and the output shaft controls the supply and discharge of the pressurized fluid.

BRIEF DESCRIPTION OF THE DRAWINGS

FIG. 2A is a partial side elevational view of a torsion bar;

FIG. 2B is a partial side elevational view of an input shaft; and

FIGS. 2C and 2D are partial explanatory views illustrating the assembly of the input shaft and the torsion bar.

DETAILED DESCRIPTION OF A PREFERRED EMBODIMENT

Figure 1:
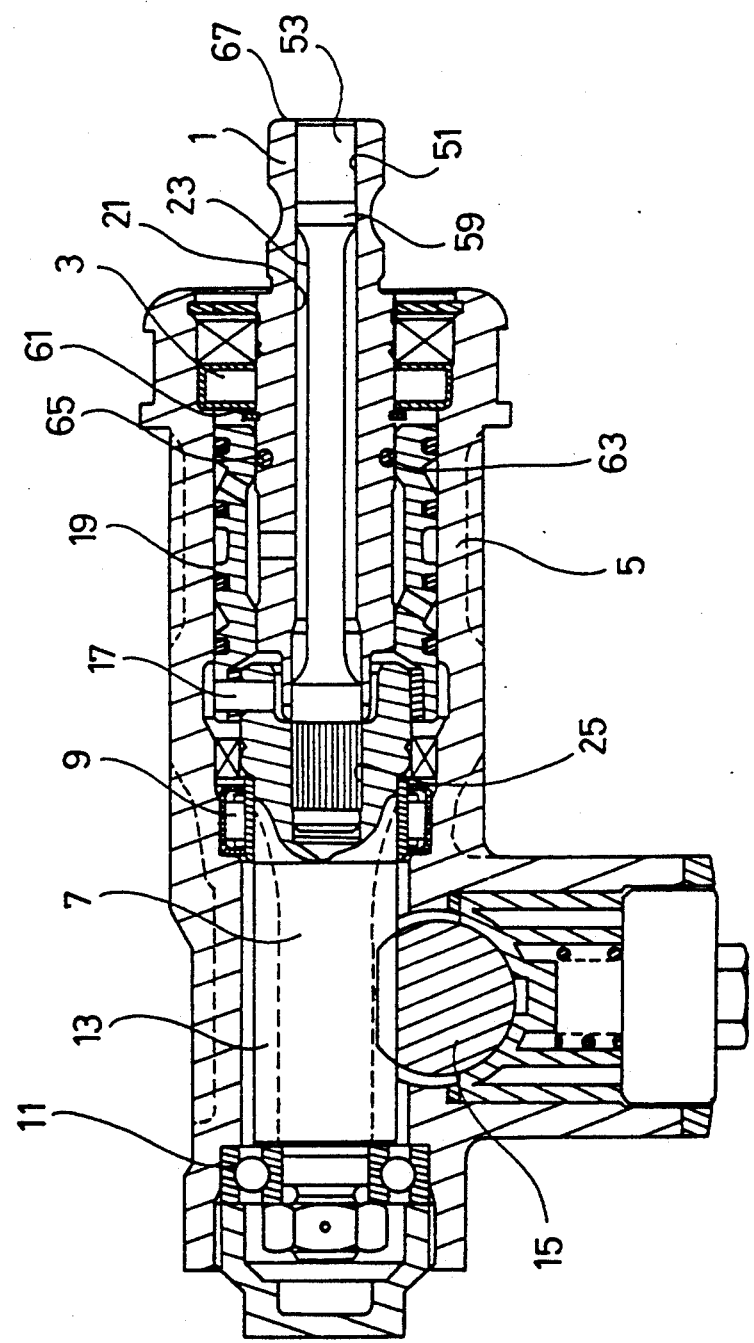
FIG. 1 is a partial cross-sectional view of a rotary valve for a power steering unit according to an embodiment of the invention.

As shown in FIG. 1, a rotary valve comprises an input shaft 1, which is rotated by the operation of a steering wheel (not shown) and is rotatably supported by a bearing 3 of a rotary valve housing or body 5. An output shaft 7, concentric with the input shaft 1, is rotatably supported by bearings 9 and 11 of the rotary valve body 5. The output shaft 7 has on its outer periphery a pinion gear 13 which meshes with a rack 15 connected via a connecting mechanism (not shown) to the vehicle wheels (not shown). The output shaft 7 is also connected via a pin 17 to a valve sleeve 19 fitted onto the outer periphery of the input shaft 1. The valve sleeve 19 is also connected, via a pressurized fluid passage (not shown), to a pump, a tank and a power cylinder (not shown). The input shaft 1 has therein a central bore 21 for concentrically receiving a torsion bar 23. A second end of the torsion bar 23 has a serration which is press-fitted into a mating opening 25 in the output shaft 7, thus securely engaging the torsion bar 23 with the output shaft 7.

When the input shaft 1 is rotated and the torsion bar 23 is resiliently deformed, displacement is caused by the relative rotation of the input shaft 1 and the valve sleeve 19, thus controlling the supply and discharge of pressurized fluid.

The interconnection of the ends of the input shaft 1 and the torsion bar 23 are now explained with reference to FIGS. 2A and 2B.

At the first end of the input shaft 1 remote from the output shaft 7, the bore 21 is concentric with and axially adjacent to a securing bore 51 for receiving therethrough a first end of the torsion bar 23. The first end of the torsion bar 23 comprises a cylindrical engaging portion 59, a cylindrical guide portion 53 connected to the engaging portion 59, and a cylindrical chuck portion 57 connected, via a notch 55, to the guide portion 53. When the rotary valve is assembled as described later, the chuck portion 57 is grasped with an appropriate jig (not shown). The bore 21 in the input shaft 1 has an inner diameter appropriately sized for receiving the engaging portion 59.

As shown in FIG. 2A, the engaging portion 59 has an outer diameter dA of about 8.6 mm and the securing bore 51 has an inner diameter dC of about 8.45 mm, in this embodiment, and thus an interference of 0.15 mm is present so that the engaging portion 59 can be press-fitted into the securing bore 51. An outer diameter dB of the guide portion 53 is slightly smaller than the inner diameter dC of the securing bore 51 as shown in FIG. 2B. Therefore, the torsion bar 23 can be easily inserted into the securing bore 51 in the first end of the input shaft 1. At the same time, when the input shaft 1, having therethrough the torsion bar 23, is rotated, the input shaft 1 and the torsion bar 23 are kept centered.

When the torsion bar 23 is press-fitted into the input shaft 1 as described later, the notch 55 is substantially aligned with an end face 67 of the input shaft 1. The notch 55 is cut deep enough in a periphery of the torsion bar 23 so that the notch 55 can be broken or cut off under a bending stress applied to the chuck portion 57. The chuck portion 57 has an outer diameter appropriate for passing through the securing bore 51 and has a shape which facilitates grasping by an appropriate jig.

As shown in FIGS. 1 and 2D, the input shaft 1 has on its outer periphery a snap ring 61 snapped at a desired position and a groove 63 for receiving an O ring 65.

The steps for assembling the rotary valve of this embodiment are hereinafter explained. After the torsion bar 23 is fitted into the input shaft 1, as shown in FIG. 2C, the assembled rotary valve is connected to a central position detecting unit (not shown). The central position of the input shaft 1 is detected by rotating the input shaft 1 concentrically with the torsion bar 23 clockwise and counterclockwise. Thus the central position is determined such that the hydraulic pressure, generated when the input shaft 1 is rotated by some angle clockwise from the central position relative to the output shaft 7, is symmetrical in its characteristics with the hydraulic pressure generated when the input shaft 1 is rotated by the same angle counterclockwise from the central position. While the determined central position in a peripheral direction of the input shaft 1 relative to the torsion bar 2 is maintained, the input shaft 1 is axially secured. As shown in FIG. 2D, the torsion bar 23 is pulled into the input shaft 1 until the engaging portion 59 engages in the securing bore 51. When the notch 55 is aligned flush with the end face 67, further pulling of the torsion bar 23 is stopped. After the torsion bar 23 is thus press-fitted in position to the input shaft 1, the notch 55 is folded or broken off and the chuck portion 57 is removed.

The operation of the rotary valve having the aforementioned structure is now explained. A torque generated by the operation of the steering wheel is transmitted to the input shaft 1. When the input shaft 1 is rotated, the torque is transmitted, via the torsion bar 23, to the output shaft 7. At the same time, the output shaft 7 receives a load of reaction force from the associated vehicle wheels. Therefore, the torsion bar 23 is resiliently deformed, thus causing relative displacement in rotation of the input shaft 1 and the output shaft 7. Since the output shaft 7 is connected to the valve sleeve 19, the relative rotation displacement results between the valve sleeve 19 and the input shaft 1, thus controlling the supply and discharge of pressurized fluid.

From the above description of a preferred embodiment of the invention, those skilled in the art will perceive improvements, changes, and modifications. Such improvements, changes and modifications within the skill of the art are intended to be covered by the appended claims.

What is claimed is:

1. A rotary valve, for controlling supply and discharge of pressurized fluid, comprising an input shaft, having a through bore extending therethrough, an output shaft being arranged concentrically with the input shaft, and a torsion bar being concentrically supported within said through bore, said torsion bar having a first end connected to said input shaft and a second end connected to said output shaft, and said rotary valve controlling, via a rotation of said input shaft relative to said output shaft, the supply and the discharge of the pressurized fluid, wherein:

a first end of said input shaft, remote from said output shaft, has a securing bore located concentrically with said through bore; and a first end of said torsion bar, remote from said output shaft, has a chuck portion with a diameter smaller than a diameter of said securing bore, and an engaging portion spaced from said chuck portion by notch means, said engaging portion is sized and shaped to be securely press-fitted into said securing bore, and said notch means facilitates removal of said chuck portion from said engaging portion once said engaging portion is securely press-fitted into said securing bore.

2. A rotary valve according to claim 1, wherein a rotary valve housing supports said input shaft and said output shaft, and a plurality of bearings are supported within said rotary valve housing to facilitate rotation of said input shaft and said output shaft relative to said rotary valve housing.

3. A rotary valve according to claim 1, wherein said output shaft supports, on an outer periphery thereof, a pinion gearing meshing with a rack mechanism.

4. A rotary valve according to claim 1, wherein a valve sleeve, fixedly connected to said output shaft, surrounds at least a portion of an outer periphery of said input shaft.

5. A rotary valve according to claim 5, wherein a pin fixedly connects said output shaft to said valve sleeve.

6. A rotary valve according to claim 1, wherein a second opposed end of said torsion bar has a serration which is press-fitted into a mating opening in an axial end of said output shaft, adjacent said input shaft, for fixedly connecting said torsion bar to said output shaft.

7. A rotary valve according to claim 1, wherein said torsion bar has a guide portion located between said notch means and said engaging portion.

8. A rotary valve according to claim 7, wherein said guide portion is cylindrical and has a smaller diameter than a diameter of said engaging portion.

9. A rotary valve according to claim 1, wherein said notch means comprises a notch extending completely around the peripheral surface of said torsion bar to facilitate removal of said chuck portion from said engaging portion.

10. A rotary valve according to claim 1, wherein said chuck portion has a diameter smaller than a diameter of said securing bore to facilitate passage of said chuck portion through said securing bore, and said chuck portion is shaped to facilitate grasping by a suitable jig.

11. A rotary valve according to claim 1, wherein said engaging portion has an interference fit of about 0.15 mm with said securing bore.

12. A rotary valve according to claim 1, wherein a diameter of said securing bore is smaller than a diameter of said through bore.

13. A rotary valve according to claim 1, wherein said input shaft has an end face located remote from said output shaft, and said notch means is substantially aligned with said end face of said input shaft once said engaging portion is securely press-fitted into said securing bore.

14. A rotary valve according to claim 13, wherein said chuck portion is removed from said torsion bar after said engaging portion is securely fitted into said securing bore.

15. A rotary valve according to claim 2, wherein an outer peripheral surface of said input shaft accommodates a snap ring which engages one of the plurality of bearings.

16. A rotary valve according to claim 4, wherein a groove is formed in an outer peripheral surface of said input shaft and said groove supports an O ring which prevents the pressurized fluid from exiting from one end between said valve sleeve and said input shaft.

17. A method of assembling a rotary valve, for controlling supply and discharge of pressurized fluid, comprising an input shaft, having a through bore extending therethrough, an output shaft being arranged concentrically with the input shaft, and a torsion bar being concentrically supported within said through bore, said torsion bar having a first end connected to said input shaft and a second end connected to said output shaft, and said rotary valve controlling, via a rotation of said input shaft relative to said output shaft, the supply and the discharge of the pressurized fluid, wherein:

a first end of said input shaft, remote from said output shaft, has a securing bore located concentrically with said through bore; and a first end of said torsion bar, remote from said output shaft, has a chuck portion with a diameter smaller than a diameter of said securing bore, and an engaging portion spaced from said chuck portion by notch means, said engaging portion is sized and shaped to be securely press-fitted into said securing bore, and said notch means facilitates removal of said chuck portion from said engaging portion once said engaging portion is securely press-fitted into said securing bore, said method comprising the steps of:

press-fitting said engaging portion of said torsion bar into said securing bore of said input shaft; and thereafter removing the chuck portion from the first end of said torsion bar.

18. A method of assembling a rotary valve according to claim 17, further comprising the step of:

detecting a central position of said rotary valve prior to press-fitting said engaging portion of said torsion bar into said securing bore of said input shaft.

19. A method of assembling a rotary valve according to claim 18, further comprising the step of:

forcing said engaging portion into said securing bore, after detecting the central position of said rotary valve, until an end face of said input shaft is substantially aligned with said notch means.

20. A method of assembling a rotary valve according to claim 17, further comprising the step of:

rotating said input shaft alternately clockwise and counterclockwise, prior to press-fitting engaging portion of said torsion bar into said securing bore of said input shaft, to determine a central position of said rotary valve.

* * * * *